United States Patent
Pallini et al.

(10) Patent No.: US 10,767,688 B2
(45) Date of Patent: Sep. 8, 2020

(54) BEARING SYSTEM FOR AN ARTICULATING MOTOR DEVICE

(71) Applicant: Roller Bearing Company of America, Inc., Oxford, CT (US)

(72) Inventors: Robert Pallini, Cheltenham, PA (US); Michael Coppola, Naugatuck, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 16/366,565

(22) Filed: Mar. 27, 2019

(65) Prior Publication Data

US 2019/0301525 A1 Oct. 3, 2019

Related U.S. Application Data

(60) Provisional application No. 62/648,621, filed on Mar. 27, 2018.

(51) Int. Cl.
*F16C 19/18* (2006.01)
*F16C 33/78* (2006.01)
(Continued)

(52) U.S. Cl.
CPC ............ *F16C 19/18* (2013.01); *F16C 13/006* (2013.01); *F16C 19/547* (2013.01); *F16C 33/784* (2013.01); *F16C 33/7826* (2013.01); *F16C 33/7886* (2013.01); *H02K 5/1732* (2013.01); *F16C 2226/10* (2013.01);
(Continued)

(58) Field of Classification Search
CPC ...... F16C 13/006; F16C 19/18; F16C 19/541; F16C 19/547; F16C 27/066; F16C 33/784; F16C 33/765; F16C 33/7826; F16C 33/7886; H02K 5/1732; H02K 5/173
USPC ......... 384/477, 488–489, 504, 517; 277/349, 277/374, 369
See application file for complete search history.

(56) References Cited

U.S. PATENT DOCUMENTS 3,371,971 A 2/1966 Bozsvai
3,568,962 A * 3/1971 Janssen ................ F16C 27/066
384/536

(Continued)

FOREIGN PATENT DOCUMENTS

CN 202578495 U 12/2012
EP 2818741 A1 12/2014
(Continued)

*Primary Examiner* — Marcus Charles
(74) *Attorney, Agent, or Firm* — Murtha Cullina LLP

(57) ABSTRACT

A bearing system for a rotating vertical shaft includes a first ball bearing, having a first pitch diameter and a first axial stiffness and a second ball bearing having a second pitch diameter and a second axial stiffness. The first ball bearing is a deep groove Conrad bearing. The second ball bearing is an angular contact bearing. The first and second ball bearings are coaxial, secured to one another and rotatable together. The first pitch diameter is at least 1.5 times greater than the second pitch diameter. The bearing system has an axial stiffness ratio defined by the first axial stiffness divided by the second axial stiffness. The axial stiffness ratio is based on an axial preload force applied to the second outer ring such that an operating torque of the bearing system is within a predetermined range at temperatures from minus 40 to positive 85 degrees Celsius.

21 Claims, 10 Drawing Sheets

(51) Int. Cl.
  *F16C 19/54* (2006.01)
  *H02K 5/173* (2006.01)
  *F16C 13/00* (2006.01)

(52) U.S. Cl.
  CPC ...... *F16C 2240/14* (2013.01); *F16C 2240/80* (2013.01); *F16C 2380/26* (2013.01)

(56) References Cited

U.S. PATENT DOCUMENTS

| | | | |
|---|---|---|---|
| 3,640,593 A | 2/1972 | McKee et al. | |
| 3,869,181 A * | 3/1975 | Barber | F16C 23/086 384/482 |
| 4,309,063 A * | 1/1982 | Weis | F16J 15/3224 384/482 |
| 4,863,293 A * | 9/1989 | Sytsma | F16C 13/006 384/482 |
| 5,274,288 A * | 12/1993 | Stefansky | H02K 5/173 310/90 |
| 5,687,016 A * | 11/1997 | Seto | G02B 26/121 359/200.1 |
| 6,102,575 A * | 8/2000 | Obara | F16C 19/18 384/480 |
| 6,360,616 B1 | 3/2002 | Halliday et al. | |
| 6,854,893 B2 * | 2/2005 | Schmidt | F16C 13/006 384/477 |
| 6,914,578 B1 | 7/2005 | Menahem | |
| 7,341,379 B2 * | 3/2008 | Koyama | G11B 5/4813 384/488 |
| 8,579,512 B2 * | 11/2013 | Radinger | F16C 33/78 384/473 |
| 9,041,264 B2 * | 5/2015 | Langford | H02K 7/083 310/51 |
| 9,051,971 B2 | 6/2015 | Zhang | |
| 9,133,846 B2 * | 9/2015 | Kobayashi | F01C 1/0215 |
| 2005/0002816 A1 | 1/2005 | Okayama et al. | |
| 2005/0262689 A1 * | 12/2005 | Sato | F01C 1/0215 29/888.022 |
| 2007/0242913 A1 * | 10/2007 | Kawaguchi | F16C 19/182 384/504 |
| 2011/0248510 A1 | 10/2011 | Yan et al. | |
| 2011/0311350 A1 * | 12/2011 | Takahashi | F02B 33/40 415/170.1 |
| 2016/0025258 A1 | 1/2016 | Shannahan et al. | |
| 2017/0219010 A1 | 8/2017 | Diener et al. | |
| 2018/0010728 A1 | 1/2018 | Shannahan et al. | |
| 2018/0298950 A1 * | 10/2018 | Li | F16C 35/042 |

FOREIGN PATENT DOCUMENTS

| | | |
|---|---|---|
| EP | 2995550 A1 | 3/2016 |
| WO | 2014024645 A1 | 2/2014 |

\* cited by examiner

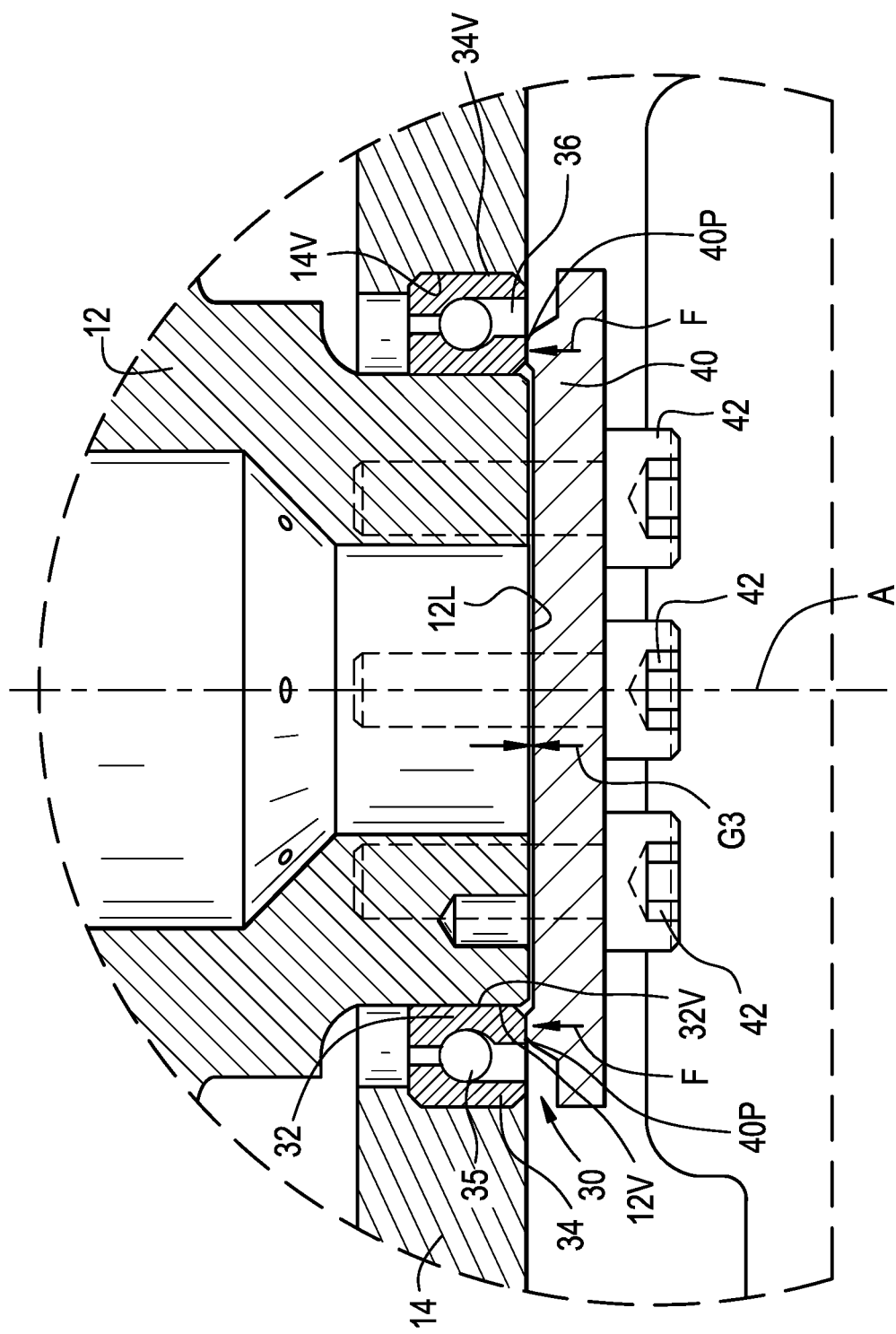

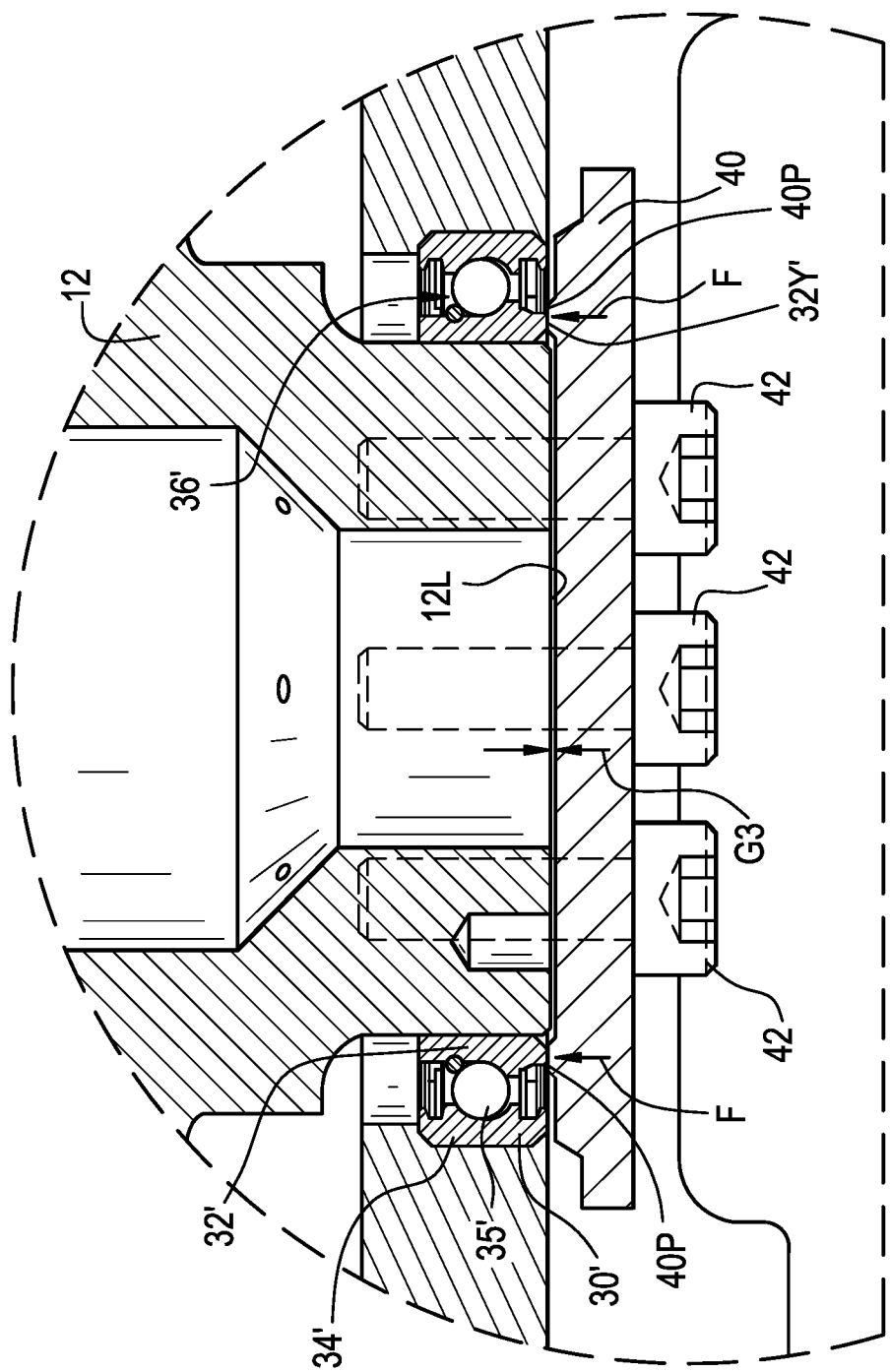

TORQUE -vs- TEMPERATURE
Pre-load force (F) 25 pounds

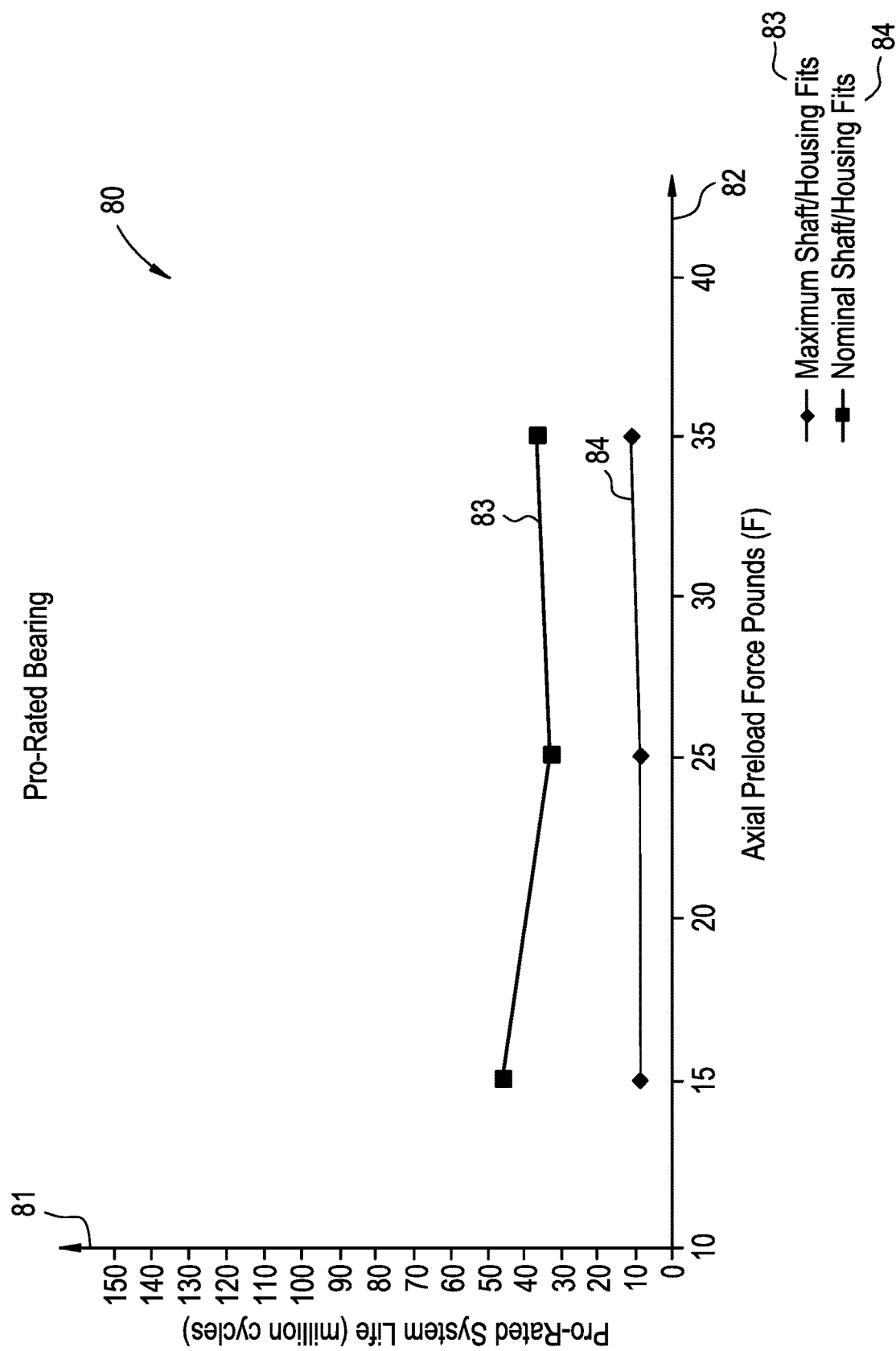

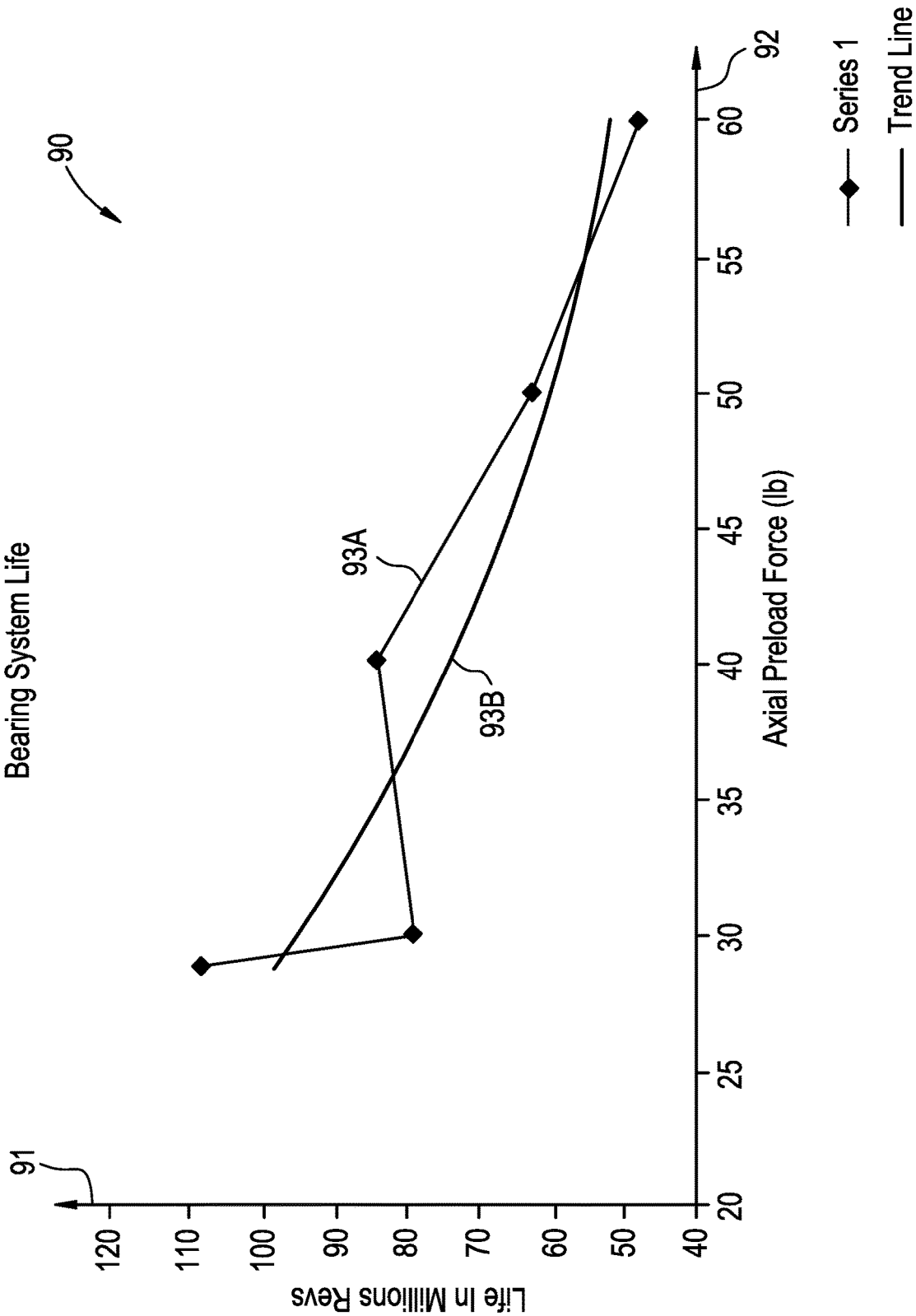

BEARING SYSTEM FOR AN ARTICULATING MOTOR DEVICE

CROSS REFERENCE TO RELATED APPLICATIONS

The instant application is a non-provisional of, and claims priority benefit to provisional patent application No. 62/648,621, entitled, "Bearing System for an Articulating Motor Device," filed Mar. 27, 2018, the entirety of which is incorporated by reference herein.

FIELD OF THE INVENTION

The present invention relates generally to a bearing system for a motor device and more particularly to a bearing system having an angular contact bearing and a deep groove Conrad bearing with a larger pitch diameter and less axial stiffness than the angular contact bearing, installed in a vertical shaft motor device of dissimilar materials and configured to operate at temperatures of minus 40 to positive 85 degrees Celsius while maintaining operating torque within a predetermined range.

BACKGROUND OF THE INVENTION

Bearings are typically used in various rotating devices such as motors to support a rotating shaft in a frame. Typically, two identical bearings are positioned on opposing ends of the shaft with a respective inner ring of each bearing secured to the shaft and a respective outer ring of each bearing secured to the frame. A plurality of balls are typically positioned between the inner ring and outer ring of each bearing. Such motors are often installed with the shaft in a horizontal position. Typically, the shaft, the inner rings, the outer rings and the balls are manufactured from an iron based alloy such as a bearing grade alloy steel. Such motors are often operated at normal ambient temperatures or close thereto.

However, some motors are installed with the shaft in a vertical position and are operated in an oscillatory manner. Some motors are required to operate under extreme hot to cold temperature ranges. In addition, in certain applications, weight reduction is important and light-weight materials such as aluminum may be employed for the shaft and/or frame. However, the bearings are typically made from an iron based alloy (e.g., steel) to maintain adequate load carrying performance. Use of different metallic materials for the bearings, shaft and frame in vertical shaft installations make it difficult to maintain operating torque in an acceptable predetermined range at the extreme temperature ranges due to differences in coefficients of thermal expansion between the bearings, shaft and frame.

Based on the foregoing, there is a need for an improved bearing system capable of operating at an acceptable operating torque under the foregoing conditions.

SUMMARY OF THE INVENTION

There is disclosed herein a bearing system for a rotating vertical shaft which includes a first ball bearing and a second ball bearing. The first ball bearing has a first pitch diameter and a first axial stiffness. The first ball bearing has a first inner ring disposed in a first outer ring and a first plurality of balls rollingly positioned between the first inner ring and the first outer ring. The first plurality of balls rollingly engage a first exterior raceway of the first inner ring and a first interior raceway of the first outer ring at respective first axial centerlines of the first exterior raceway and the first interior raceway. The second ball bearing has a second pitch diameter and a second axial stiffness. The second ball bearing has a second inner ring disposed in a second outer ring and a second plurality of balls rollingly positioned between the second inner ring and the second outer ring. The second plurality of balls rollingly engage a second exterior raceway of the second inner ring and a second interior raceway of the second outer ring, wherein the second plurality of balls engage the counter bore at an angle offset from second axial centerlines of the second exterior raceway and the second interior raceway. The first inner ring and the second inner ring are coaxial, secured to one another and rotatable together. The first pitch diameter is at least 1.5 times greater than the second pitch diameter. The bearing system has an axial stiffness ratio defined by the first axial stiffness divided by the second axial stiffness. The magnitude of the axial stiffness ratio is based on an axial preload force applied to the second outer ring such that an operating torque of the bearing system is within a predetermined range at temperatures from minus 40 degrees Celsius to positive 85 degrees Celsius.

In one embodiment, the preload force is from 15 to 35 pounds. In one embodiment, the operating torque is between zero and 50 foot-pounds. In one embodiment, the first pitch diameter is at least 2.0 times greater than the second pitch diameter. In one embodiment, the axial stiffness ratio is from 1.1 to 1.7.

In one embodiment, the first inner ring and the second inner ring are secured to one another by a shaft.

In one embodiment, the first inner ring and the second inner ring are manufactured from an iron based alloy and the shaft is manufactured from a material other than an iron based alloy, such as an aluminum alloy.

In one embodiment, the bearing system includes a load distribution member adjustably secured to the shaft via one or more fasteners. The load distribution member engages one of the second inner ring and the second outer ring to apply the axial preload force thereto. In one embodiment, there is an axial gap between the load distribution member and an adjacent axial end of the shaft.

In one embodiment, the first outer ring and the second outer ring are connected to one another by a frame. In one embodiment, the frame is manufactured from a material other than an iron based alloy, such as an aluminum based alloy.

In one embodiment, the first inner ring, the first outer ring, the first plurality of balls, the second inner ring, the second outer ring and/or the second plurality of balls is manufactured from an iron based alloy.

In one embodiment, the first inner ring and/or the second inner ring are secured to the shaft by slip fit. In one embodiment, the first outer ring and/or the second outer ring is secured to the frame by an interference fit.

In one embodiment, the bearing system is employed in a motor device (e.g., an articulating motor device for a radar sensing system) that includes a stator in fixed relation to the frame, the first outer ring and the second outer ring; and a rotor in fixed relation to the shaft, the first inner ring and the second inner ring. The rotor is positioned in the stator and rotatable therein upon introduction of an electric current to the rotor.

BRIEF DESCRIPTION OF THE DRAWINGS

FIG. 3A is an enlarged view of a lower portion of the bearing system of FIG. 1, shown with a load distribution member thereon;

FIG. 3B is an enlarged view of a lower portion of the bearing system of FIG. 1, shown with a load distribution member thereon;

FIG. 5 is a graphical plot of prorated bearing life versus preload force for the bearing system of FIGS. 1-3; and FIG. 6 is another graphical plot of bearing life versus preload force for the bearing system of FIGS. 1-3.

DETAILED DESCRIPTION

Figure 1:
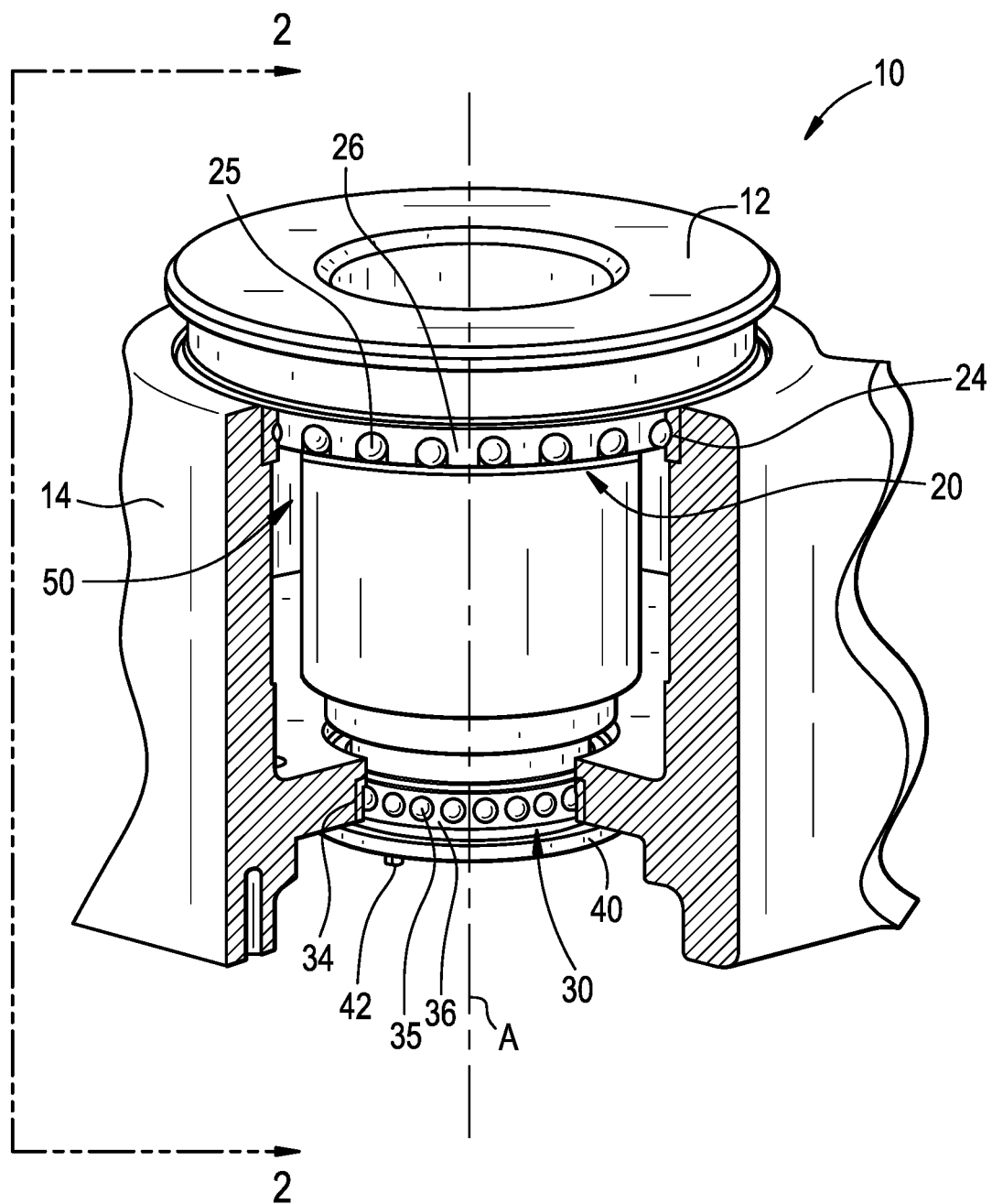
FIG. 1 is a perspective cut away view of the motor device having the bearing system of the present invention installed therein.

As shown in FIG. 1, a motor with a vertical shaft is generally designated by the numeral 10. The motor 10 includes a stepped shaft 12 (e.g., a hollow shaft that has several various outside and/or inside diameters) that is oriented vertically and coaxially with a vertical axis A. As best shown in FIG. 2, the shaft 12 has a first outside diameter D1 proximate a first axial end 12L of the shaft 12 (i.e., at a second outer cylindrical surface 12V at a lower axial end of the shaft 12). The shaft 12 has a second outside diameter D2 at a distance below and proximate to a second axial end 12U of the shaft 12 (i.e., at a first outer cylindrical surface 12Q proximate an upper end of the shaft 12). The first outside diameter D1 is less than the second outside diameter D2. In one embodiment, the second outside diameter D2 is about 1.5 times greater than the first outside diameter D1. In one embodiment, the second outside diameter D2 is about two times greater than the first outside diameter D1.

Figure 2A:
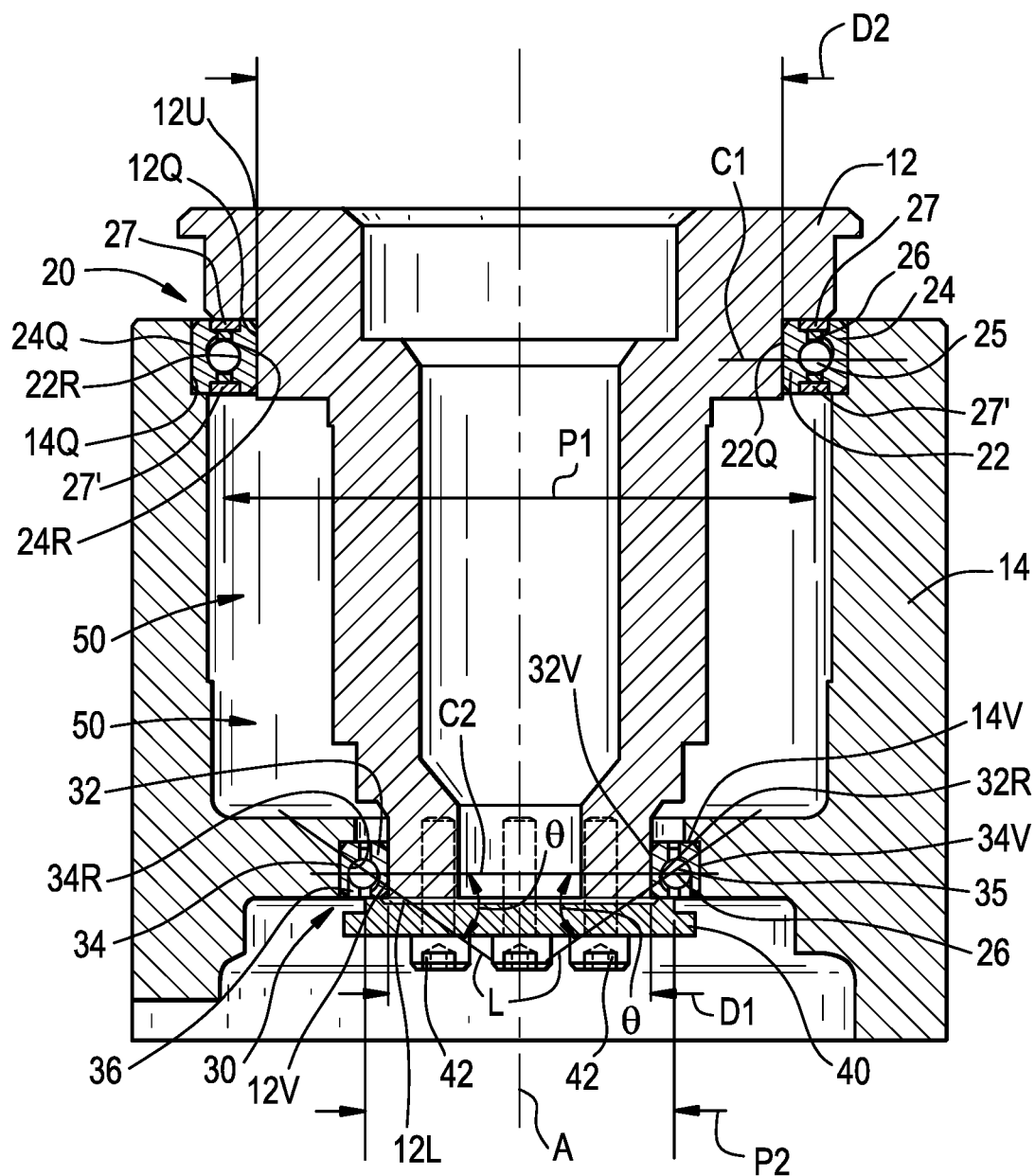
FIG. 2A is a cross sectional view of the motor device and bearing system of FIG. 1 taken across section 2-2.

Referring to FIG. 1 and FIG. 2A, the shaft 12 is rotatably supported in a frame 14 by a bearing system that includes a first ball bearing 20 (e.g., a deep groove Conrad bearing) and a second ball bearing 30 (e.g., an angular contact bearing). The first ball bearing 20 has a first pitch diameter P1 and a first axial stiffness in units of pounds per inch. The first ball bearing 20 has a first inner ring 22 disposed in a first outer ring 24 and a first plurality of balls 25 rollingly positioned between the first inner ring 22 and the first outer ring 24. The first plurality of balls 25 rollingly engage a first exterior raceway 22R of the first inner ring 22 and a first interior raceway 24R of the first outer ring 24 at respective first axial centerlines Cl of the first exterior raceway and the first interior raceway. As used herein the term "pitch diameter" means the diameter of the circle that the center point of each of the plurality of balls 25 travels during rotation.

The first ball bearing 20 includes a cage 26 that uniformly spaces each of the plurality of balls 25 apart from one another. In one embodiment, the first ball bearing 20 includes a seal 27 extending between the first inner ring 22 and the first outer ring 24 at one axial ends thereof and another seal 27' at an opposing axial end thereof to prevent debris from contaminating interior areas of the first ball bearing 20 and to retain a lubricant therein.

The second ball bearing 30 has a second pitch diameter P2 and a second axial stiffness. The second ball bearing 30 has a second inner ring 32 disposed in a second outer ring 34 and a second plurality of balls 35 rollingly positioned between the second inner ring 32 and the second outer ring 34. The second plurality of balls 35 rollingly engage a second exterior raceway 32R of the second inner ring 32 and a second interior raceway 34R of the second outer ring 34 along a line of contact L. In one embodiment, the first pitch diameter P1 is at least 1.5 times greater than the second pitch diameter P2. In one embodiment, the first pitch diameter is at least 2.0 times greater than the second pitch diameter P2.

The first inner ring 22 is a continuous one-piece annular metallic component. The first outer ring 24 is a continuous one-piece annular metallic component. The second inner ring 32 is a continuous one-piece annular metallic component. The second outer ring 34 is a continuous one-piece annular metallic component. However, the present invention is not limited in this regard as any or all of the first inner ring 22, the first outer ring 24, the second inner ring 32 and the second outer ring 34 may be axial split rings having one or more axial splits or fractures extending therethrough and may include more than one section pieced together to form the respective ring.

Referring to FIGS. 1 and 2A a cavity 50 is provided in the frame 14 for disposing stator windings (not shown) therein. The shaft 12 carries rotor windings (not shown) that are rotatable with the shaft 12. The frame 14 and the stator windings are in fixed relation to the first outer ring 24 of the first ball bearing 20 and the second outer ring 34 of the second ball bearing 30. The shaft 12 and the rotor are in fixed relation to the first inner ring 22 of the first ball bearing and the second inner ring 32 of the second ball bearing 30. The rotor is positioned in the stator windings and rotatable therein upon introduction of an electric current to the rotor. The motor 10 has utility in articulating radar sensing systems that are subject to rapid and cyclic oscillatory motion under extreme temperature ranges for minus 45 degrees Celsius to positive 85 degrees Celsius.

Figure 2B:
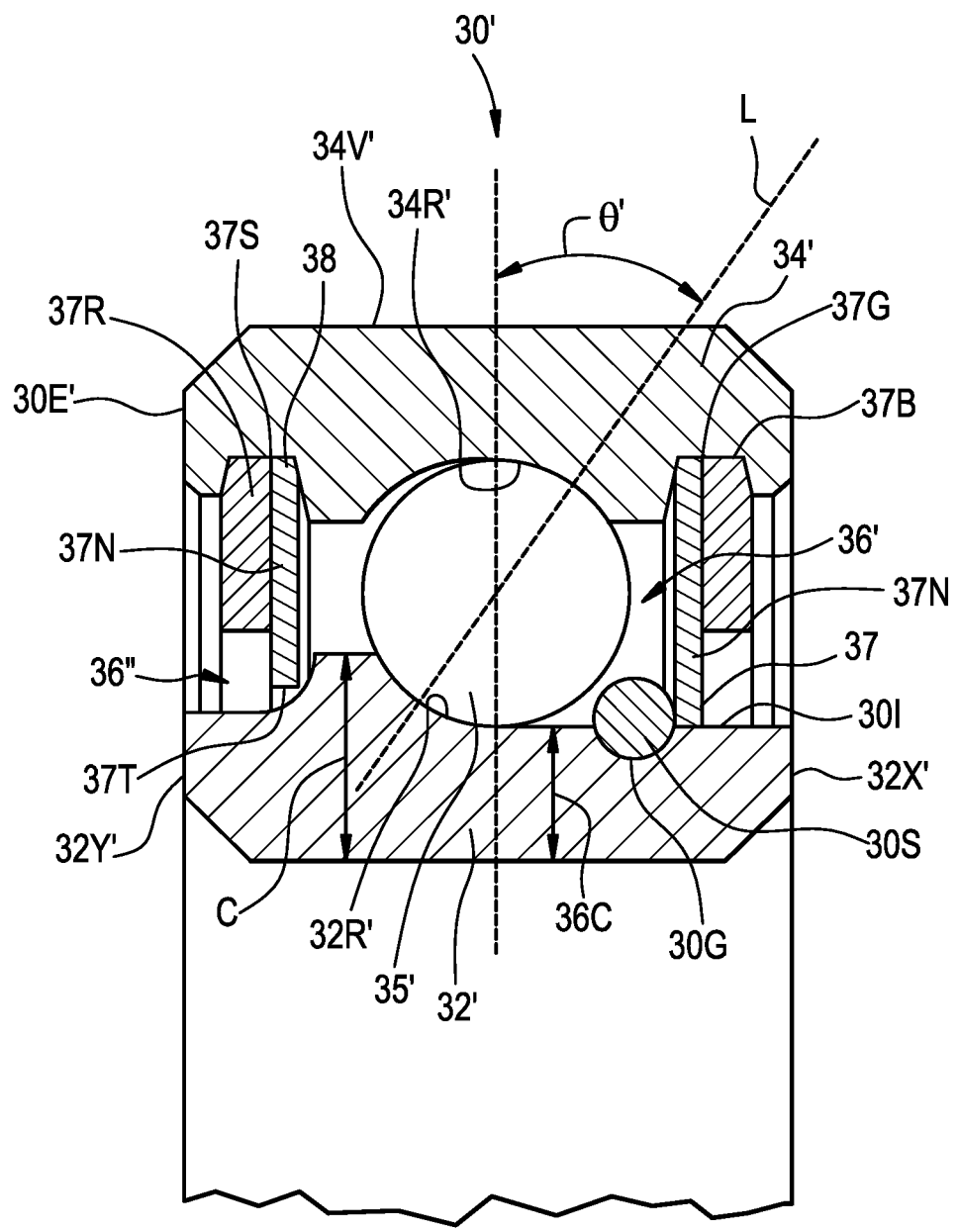
FIG. 2B is an enlarged view of the ball bearing of the bearing system of FIG. 2C, taken across section 2-2.
Figure 2C:
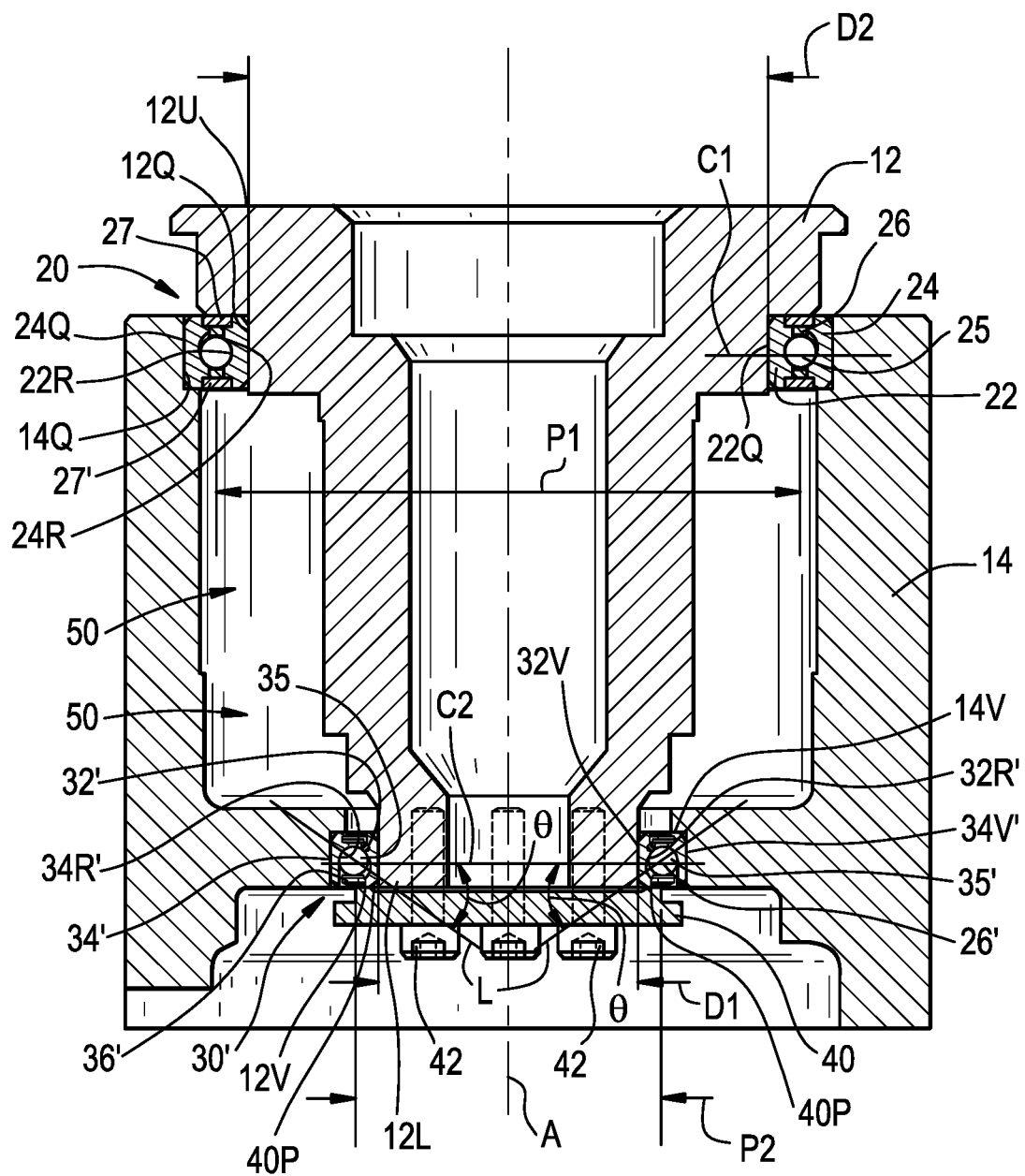
FIG. 2C is a cross sectional view of a motor device having an alternative embodiment of the bearing system of the present invention installed therein.

Referring to FIG. 2C, the shaft 12 is rotatably supported in the frame 14 by a bearing system that includes the first ball bearing 20 (e.g., a deep groove Conrad bearing) and a second ball bearing 30' (e.g., an angular contact bearing). The second ball bearing 30 has a second pitch diameter P3 and a second axial stiffness. Referring to FIG. 2B, the second ball bearing 30' has a second inner ring 32' disposed in a second outer ring 34' and a second plurality of balls 35' rollingly positioned between the second inner ring 32' and the second outer ring 34'. The second plurality of balls 35' rollingly engage a second exterior raceway 32R' of the second inner ring 32' and a second interior raceway 34R' of the second outer ring 34' along a line of contact L. In one embodiment, the first pitch diameter P1 is at least 1.5 times greater than the second pitch diameter P2. In one embodiment, the first pitch diameter is at least 2.0 times greater than the second pitch diameter P3.

The second inner ring 32' is a continuous one-piece annular metallic component. The second outer ring 34' is a continuous one-piece annular metallic component. However, the present invention is not limited in this regard as the second inner ring 32' and/or the second outer ring 34' may be axial split rings having one or more axial splits or fractures extending therethrough and may include more than one section pieced together to form the respective ring.

As shown in FIG. 2B, the second ball bearing 30' includes a counter bore 36'. The counter bore 36' is configured to form an angular contact ball bearing, where the second plurality of balls 35' rollingly engage the second exterior raceway 32R' and the second interior raceway 34R' at an angle θ', analogous to angle θ. The counter bore 36' is formed in the second inner ring 32' and the second plurality of balls 35' rollingly engage the second exterior raceway 32R' at the angle θ'.

The counter bore 36' in FIG. 2B is defined by a decreased radial cross-section 36C in the second inner ring 32' relative to ring cross section C. The decreased radial cross-section 36C' extends from a first axial end 32X' of the second inner ring 32' towards a second axial end 32Y' of the second exterior raceway 32R' and terminates at an edge E1 of the second exterior raceway 32R'.

The counter bore 36 of the second inner ring 32 of FIG. 2A is configured similar to the counter bore 36' of the second inner ring 32' as shown and described with reference to FIG. 2B. As shown in FIG. 2A, the first inner ring 22 and the second inner ring 32 are coaxial about the axis A, secured to one another and rotatable together. The first inner ring 22 and the second inner ring 32 are secured together by the shaft 12. For example, a first inside cylindrical surface 22Q of the first inner ring 22 is slip fit onto the first outer cylindrical surface 12Q of the shaft 12; and a second inside cylindrical surface 32V of the second inner ring 32 is slip fit onto a second outer cylindrical surface 12V of the shaft 12.

Referring to FIG. 2B, the second ball bearing 30' is similar to the second ball bearing 30 of FIGS. 1, 2A, and 3A with the replacement of the seals 27 and 27' (see FIG. 2A) with annular seals 37, 38 (see FIG. 2B) and elimination of the cage 26 (see FIG. 2A). The second ball bearing 30' has minimal axial space to accommodate annular seals such as the annular seals 37 and 38. Removing the cage 26 from the second ball bearing 30' enables positioning of seals, e.g., the seals 37 and 38, without substantially increasing the axial cross-section of the second ball bearing 30'.

The seal 38 is positioned adjacent to the first axial end 32Y' of the second ball bearing 30' and the seal 37 is positioned adjacent to the second axial end 32X' of the second ball bearing 30'. The annular seal 37 includes concentric, radially extending sealing portion 37S and retaining shield 37R. The sealing portion 37S and retaining shield 37R extend radially from a base portion 37B. The sealing portion 37S extends radially beyond the retaining shield 37R. The sealing portion 37S is positioned axially interior to the retaining shield 37R, and is secured to the retaining shield 37R, e.g., overmolded, adhered, via axial pressure of the retaining shield 37R, etc. The annular seals 37, 38 are secured, e.g., seated, press-fit, fixed, etc., to the second ball bearing 30' in a groove 37G positioned in the second inner ring 32' or the second outer ring 34', and are sized and shaped to receive the base portion 37B. The base portion 37B is seated into groove 37G such that the base portion frictionally engages the groove 37G. The engagement between the base portion 37B and the groove 37G substantially prevents circumferential movement of the base portion with respect to the groove 37G. In one embodiment, the base portion 37B is press fit in the groove 37G.

The sealing portion 37S includes a neck portion 37N extending from the base portion 37B and terminates at a tip portion 37T. In one embodiment, at least one of the neck portion 37N and the tip portion 37T slidingly engages a surface, e.g., surface 301, of the ring, e.g., second inner ring 32' or second outer ring 34', radially opposing the groove 37G. The sliding engagement provides negligible friction that would act to prevent rotation of second inner ring 32' and second outer ring 34'. In embodiments without the cage 26, a full complement of balls 35' are positioned between the second inner ring 32' and the second outer ring 34'.

As shown in FIG. 2B, the seal 38 is positioned adjacent to the first axial end 32Y' of the second ball bearing 30' axially opposite second axial end 32X'. The seal 38 is configured similar to the seal 37 described herein. The seal 38 is fitted into the second ball bearing 30 thought a second counter bore 36", which axially opposes the first counter bore 36'. Although two seals 37 and 38 and two counter bores 36' and 36" are shown and described in FIG. 2B, the present invention is not limited in this regard as other configurations may be employed including, not limited to, only one seal, an additional one or more seals, etc., without departing from the broader aspects of the present invention.

In one embodiment, a snap wire 30S (e.g., a annular ring, split ring or spring ring) is positioned in a groove 30G provided in the counter bore 36'. The groove 30G is sized and shaped to receive snap wire 30S. Frictional engagement between the snap wire 30S and the groove 30G substantially prevent circumferential and axial movement of the snap wire with respect to the groove 30G. The groove 30G and the snap wire 30S extend circumferentially around the surface 301 of the second inner ring 32'. In one embodiment, the groove 30G and the snap wire 30S extend circumferentially around an inner surface the second outer ring 34'. Although snap wire 30S and groove 30G are shown with a circular cross-section, the present invention is not limited in this regard as other configurations may be employed, including square, triangular, etc., without departing from the broader aspects of the present invention. In one embodiment, the groove 30G is formed in the second inner ring 32' and/or the second outer ring 34' adjacent to the second axial end 32Y'. In embodiments having a multi-piece construction of the second ball bearing 30', the snap wire 30S acts to hold the sections of the second ball bearing 30' together, such that the second ball bearing 30' cannot be disassembled while the snap wire is in place. In one embodiment, at least one of the neck portion 37N and the tip portion 37T slidingly engages the snap wire 30S such that the seal provides negligible friction preventing rotation of second inner ring 32' and second outer ring 34'. In this embodiment, snap wire 30S provides backing for seal 37, and defines an air gap behind the seal 37 for application and retention of a lubricant, e.g., grease.

The angular contact of balls 35' with the counter bore 36' and corresponding frictional fit inhibit axial movement of the balls through the counter bore and thus contact between the balls and the snap wire 30S. Additionally, the snap wire 30S is sized and/or positioned so as not to contact the balls 35' while also providing a sliding engagement with the seal 37.

The sealing portion 37S includes a thermoplastic elastomer, nitrile rubber, polytetrafluoroethylene, or combinations thereof. The retaining shield 37R includes a metal. In one embodiment, the retaining shield 37R is manufactured from an iron based alloy or an aluminum alloy. In one embodiment, the retaining shield 37R includes a metal that is a 300 series stainless steel. In one embodiment, the retaining shield 37R includes a metal that is a 1008 steel. In one embodiment, the retaining shield 37R includes a metal that is a 1010 steel. In one embodiment, the snap wire 30S includes a thermoplastic elastomer, nitrile rubber, polytetrafluoroethylene, or combinations thereof. In one embodiment, the snap wire 30S includes metal.

Figure 2D:
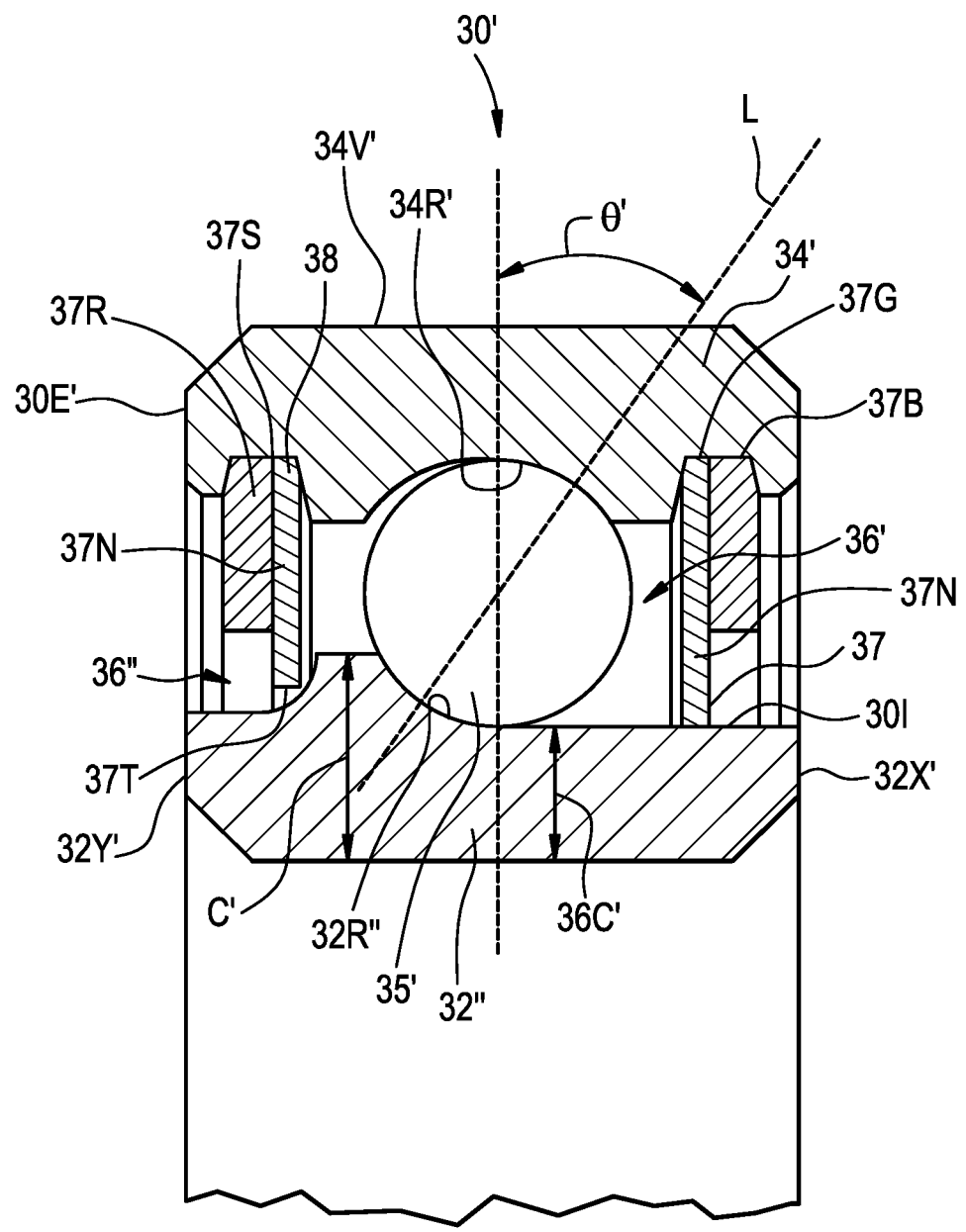
FIG. 2D is an enlarged view of an alternate embodiment of a ball bearing system compatible with the motor device of FIG. 1, taken across section 2-2.

As shown in FIG. 2D, the second ball bearing 30" includes a counter bore 36'. The counter bore 36' is configured to form an angular contact ball bearing, where the second plurality of balls 35' rollingly engage the second exterior raceway 32R" and the second interior raceway 34R' at an angle θ', analogous to angle θ. The counter bore 36' is formed in the second inner ring 32" and the second plurality of balls 35' rollingly engage the second exterior raceway 32R' at the angle θ'. The counter bore 36' in FIG. 2B is defined by a decreased radial cross-section 36C' in the second inner ring 32" relative to ring cross section C'. The decreased radial cross-section 36C' extends from a first axial end 32X' of the second inner ring 32" towards a second axial end 32Y' of the second exterior raceway 32R" and terminates at an edge of the second exterior raceway 32R".

As shown in FIG. 2A, the first outer ring 24 and the second outer ring 34 are coaxial about the axis A, secured relative to one another and rotatable together. The first outer ring 24 and the second outer ring 34 are secured relative to one another by the frame 14. For example, a first outer cylindrical surface 24Q of the first outer ring 24 is interference fit onto a first inner cylindrical surface 14Q of the frame 14; and a second outer cylindrical surface 34V of the second outer ring 34 is interference fit onto a second inner cylindrical surface 14V of the frame 14.

As shown in FIG. 2C, the first outer ring 24 and the second outer ring 34' are coaxial about the axis A, secured relative to one another and rotatable together. The first outer ring 24 and the second outer ring 34' are secured together by the frame 14. For example, a first outer cylindrical surface 24Q of the first outer ring 24 is interference fit onto a first inner cylindrical surface 14Q of the frame 14; and the outer cylindrical surface 34V' of the second outer ring 34 is interference fit onto a second inner cylindrical surface 14V of the frame 14.

The bearing system shown and described with reference to FIG. 2A has a first axial stiffness ratio defined by the first axial stiffness divided by the second axial stiffness. The magnitude of the first axial stiffness ratio is based on an axial preload force F (e.g., 15 to 35 pounds) applied to the second inner ring 32 such that an operating torque (e.g., between zero and 50 foot-pounds) of the bearing system is within a predetermined range at temperatures from minus 40 degrees Celsius to positive 85 degrees Celsius (i.e., 85 degrees above zero). In one embodiment, the first axial stiffness ratio is from 1.1 to 1.7. The first axial stiffness ratio is about 1.13 at ambient temperature, 1.21 at minus 40 degrees Celsius and 1.68 at 85 degrees Celsius.

The bearing system shown and described with reference to FIG. 2C has a second axial stiffness ratio defined by the first axial stiffness divided by the second axial stiffness. The magnitude of the second axial stiffness ratio is based on an axial preload force F (e.g., 15 to 35 pounds) applied to the second inner ring 32' such that an operating torque (e.g., between zero and 50 foot-pounds) of the bearing system is within a predetermined range at temperatures from minus 40 degrees Celsius to positive 85 degrees Celsius (i.e., 85 degrees above zero). In one embodiment, the second axial stiffness ratio is from 1.1 to 1.7. The second axial stiffness ratio is about 1.13 at ambient temperature, 1.21 at minus 40 degrees Celsius and 1.68 at 85 degrees Celsius.

As shown in FIGS. 3A-3B, a load distribution member 40 is adjustably secured to the lower axial end 12L shaft 12 via a plurality of fasteners 42 (e.g., precision threaded screws). A peripheral portion 40P of the load distribution member 40 engages a lower axial end of one of the second inner ring 32, the second inner ring 32', the second outer ring 34 or the second outer ring 34' to apply the axial preload force F thereto. By way of example, in FIG. 3A, the load distribution member 40 engages and applies the axial preload force F to the second inner ring 32. Again, by way of example, in FIG. 3B, the load distribution member 40 engages and applies the axial preload force F to the second inner ring 32' at the second axial end 32Y'. An axial gap G3 is maintained between the load distribution member 40 and the lower axial end 12L of the shaft 12 to allow for deflection and thermal expansion of the shaft 12.

In one embodiment, the first inner ring 22, the first outer ring 24, the first plurality of balls 25, the second inner ring 32, the second outer ring 34, the second plurality of balls 35, the second inner ring 32', the second outer ring 34' and the second plurality of balls 35' are manufactured from an iron based alloy (e.g., SAE 52100 bearing tool steel) and the shaft 12 and/or frame 14 is manufactured from a material other than an iron based alloy, such as an aluminum alloy.

Figure 4:
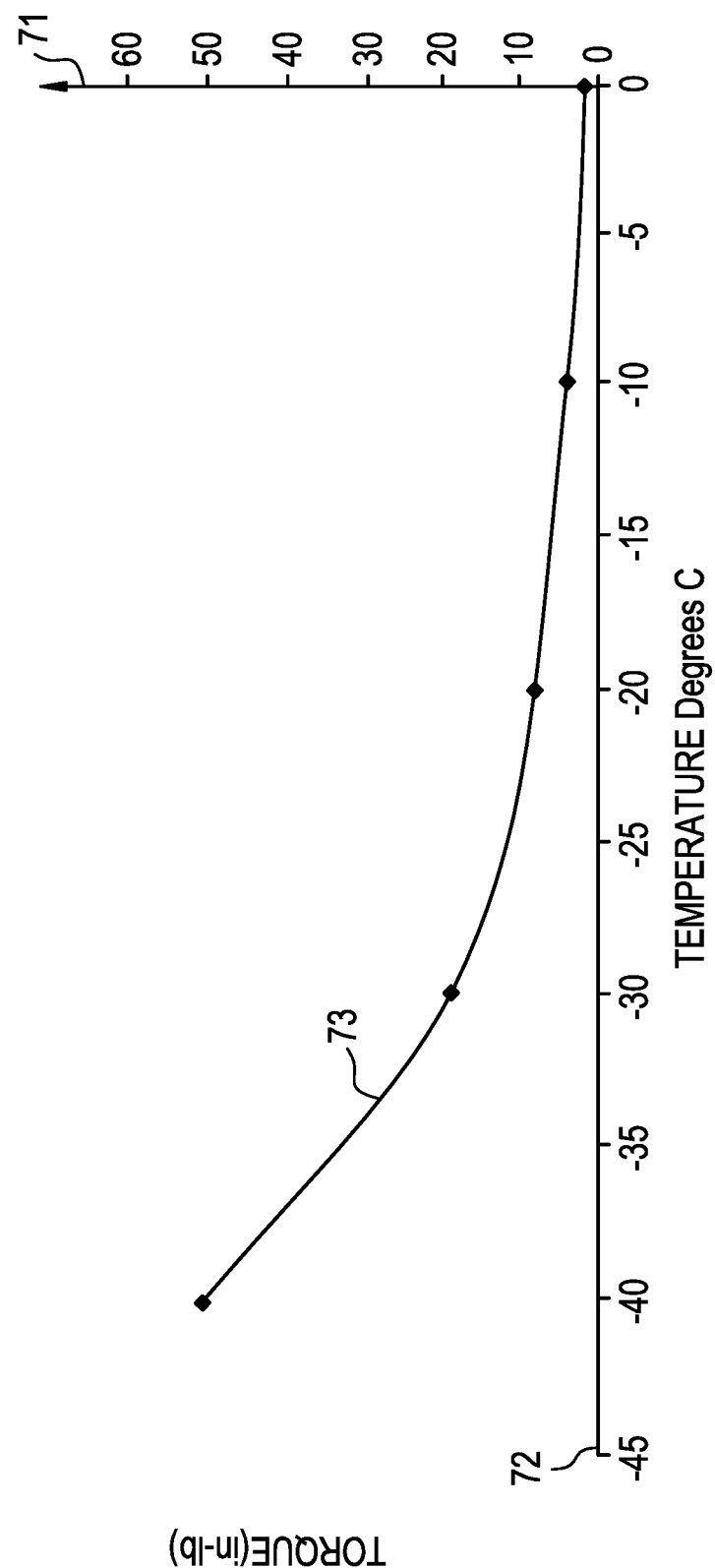
FIG. 4 is a graphical plot of torque versus temperature at a 25 pound clamping force for the bearing system of FIGS. 1-3.

Through computational analysis, applicant has surprisingly discovered a narrow range of the preload force F (i.e., 15 to 35 pounds, preferably 20 to 30 pounds) that maintains the operating torque of the bearing system in the predetermined range between zero and 50 foot pounds. As shown in FIG. 4, a graph 70 provides a plot 73 operating torque on a Y axis 71 versus temperature in degrees Celsius on an X axis 72, for a pre-load force of 25 pounds. The operating torque ranges from about 50 foot pounds at minus 40 degrees Celsius to about zero foot pounds at zero degrees Celsius and up to about 85 degrees Celsius.

As shown in FIG. 5, a graph 80 that provides plots 83 and 84 of pro-rated bearing system life in millions of cycles on a Y axis 81 versus the axial preload force F on an X axis 82, for a nominal shaft 12 to housing 14 fit 83 at 23 degrees Celsius and maximum shaft 12 to housing 14 fit 84 at 23 degrees Celsius for preload forces F from 15 to 35 pounds. The nominal and maximum fits represent opposite ends of the tolerance range of an interference fit of the shaft 12 in the housing 14.

FIG. 6 is a graph 90 that provides a plot 93A of bearing system life in millions of cycles on a Y axis 91 versus the axial preload force F on an X axis 92, for a nominal shaft 12 to housing 14 fit. A trend line 93B is shown to demonstrate that the life of the bearing systems shown in FIGS. 1, 2A and 2C decreases as the preload force increases above 35 pounds.

Although the present invention has been disclosed and described with reference to certain embodiments thereof, it should be noted that other variations and modifications may be made, and it is intended that the following claims cover the variations and modifications within the true scope of the invention.

What is claimed is:

1. A bearing system for a rotating vertical shaft, the bearing system comprising:
   a first ball bearing, having a first pitch diameter and a first axial stiffness, the first ball bearing having a first inner ring disposed in a first outer ring and a first plurality of balls rollingly positioned between the first inner ring and the first outer ring so that the first plurality of balls rollingly engage a first exterior raceway of the first inner ring and a first interior raceway of the first outer ring at respective first axial centerlines of the first exterior raceway and the first interior raceway;
   a second ball bearing having a second pitch diameter and a second axial stiffness, the second ball bearing having a second inner ring disposed in a second outer ring, and a counterbore formed in one of the second inner ring and the second outer ring; and
   a second plurality of balls rollingly positioned between the second inner ring and the second outer ring so that the second plurality of balls rollingly engage a second exterior raceway of the second inner ring and a second interior raceway of the second outer ring at an angle offset from second axial centerlines of the second exterior raceway and the second interior raceway;

the first inner ring and the second inner ring being coaxial, secured to one another and rotatable together;

the first pitch diameter being at least 1.5 times greater than the second pitch diameter; and the bearing system having an axial stiffness ratio defined by the first axial stiffness divided by the second axial stiffness, wherein the magnitude of the axial stiffness ratio is based on an axial preload force applied to the second outer ring such that an operating torque of the bearing system is within a predetermined range at temperatures from minus 40 degrees Celsius to positive 85 degrees Celsius.

2. The bearing system of claim 1, wherein the preload force is from 15 to 35 pounds.

3. The bearing system of claim 1, wherein the operating torque is between zero and 50 foot-pounds.

4. The bearing system of claim 1, wherein the first pitch diameter is at least 2.0 times greater than the second pitch diameter.

5. The bearing system of claim 1, wherein the axial stiffness ratio is from 1.1 to 1.7.

6. The bearing system of claim 1, wherein the first inner ring and the second inner ring are secured to one another by a shaft.

7. The bearing system of claim 6, wherein the first inner ring and the second inner ring are manufactured from an iron based alloy and the shaft is manufactured from a material other than an iron based alloy.

8. The bearing system of claim 7, wherein the shaft is manufactured from an aluminum alloy.

9. The bearing system of claim 6, further comprising a load distribution member adjustably secured to the shaft via at least one fastener and the load distribution member engaging one of the second inner ring and second outer ring to apply the axial preload force thereto.

10. The bearing system of claim 9, further comprising an axial gap between the load distribution member and an adjacent axial end of the shaft.

11. The bearing system of claim 6, wherein at least one of the first inner ring and the second inner ring are secured to the shaft by slip fit.

12. The bearing system of claim 1, wherein the first outer ring and the second outer ring are connected to one another by a frame.

13. The bearing system of claim 12, wherein the frame is manufactured from a material other than an iron based alloy.

14. The bearing system of claim 12, wherein the frame is manufactured from an aluminum based alloy.

15. The bearing system of claim 12, wherein at least one of the first outer ring and the second outer ring is secured to the frame by an interference fit.

16. The bearing system of claim 1, wherein at least one of the first inner ring, the first outer ring, the first plurality of balls, the second inner ring, the second outer ring and the second plurality of balls is manufactured from an iron based alloy.

17. A motor device comprising the bearing system according to claim 1, further comprising a stator in fixed relation to the frame, the first outer ring and the second outer ring and a rotor in fixed relation to the shaft, the first inner ring and the second inner ring, the rotor being positioned in the stator and rotatable therein upon introduction of an electric current to the rotor.

18. The bearing system of claim 1, wherein the second outer ring includes a circumferentially extending seal groove, and further comprising:

a first seal having a sealing portion, a retaining shield, and a base portion, the base portion disposed in the seal groove such that the base portion frictionally engages the seal groove, wherein the sealing portion includes a neck portion extending from the base portion terminating at a tip portion, the tip portion slidingly engaging the second ball bearing.

19. The bearing system of claim 18, further comprising:

a second counterbore axially opposing the first counterbore; and a second seal axially opposing the first seal.

20. The bearing system of claim 18, wherein the second ball bearing further comprises a circumferentially extending groove and a snap wire is disposed in the groove, in slidable contact with the first seal.

21. A bearing system for a rotating vertical shaft, the bearing system comprising:

a first ball bearing, having a first pitch diameter and a first axial stiffness, the first ball bearing having a first inner ring disposed in a first outer ring and a first plurality of balls rollingly positioned between the first inner ring and the first outer ring so that the first plurality of balls rollingly engage a first exterior raceway of the first inner ring and a first interior raceway of the first outer ring at respective first axial centerlines of the first exterior raceway and the first interior raceway;

a second ball bearing having a second pitch diameter and a second axial stiffness, the second ball bearing having a second inner ring disposed in a second outer ring, and a counterbore bore positioned in one of the second inner ring and the second outer ring;

a second plurality of balls rollingly positioned between the second inner ring and the second outer ring so that the second plurality of balls rollingly engage a second exterior raceway of the second inner ring and a second interior raceway of the second outer ring at an angle offset from second axial centerlines of the second exterior raceway and the second interior raceway;

the first inner ring and the second inner ring being coaxial, secured to one another and rotatable together;

the first pitch diameter being at least 1.5 times greater than the second pitch diameter; and the bearing system having an axial stiffness ratio defined by the first axial stiffness divided by the second axial stiffness, wherein the magnitude of the axial stiffness ratio is based on an axial preload force applied to the second outer ring such that an operating torque of the bearing system is within a predetermined range at temperatures from minus 40 degrees Celsius to positive 85 degrees Celsius;

wherein the second outer ring includes a circumferentially extending seal groove, and further comprising:

a first seal having a sealing portion, a retaining shield, and a base portion, the base portion disposed in the seal groove such that the base portion frictionally engages the seal groove;

wherein the sealing portion includes a neck portion extending from the base portion terminating at a tip portion, the tip portion slidingly engaging the second ball bearing, and wherein the second ball bearing further comprises a circumferentially extending groove and a snap wire is disposed in the groove, in slidable contact with the first seal.

* * * * *